May 22, 1962   A. MENDEZ   3,035,423
BOOSTER FOR REFRIGERATING SYSTEMS
Filed July 15, 1960
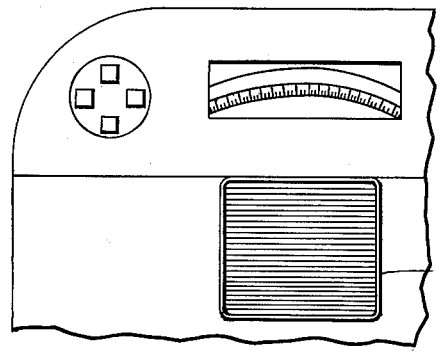
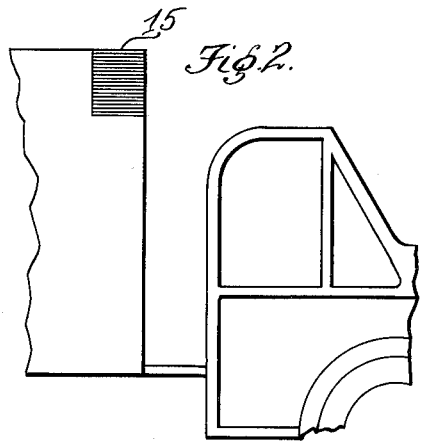
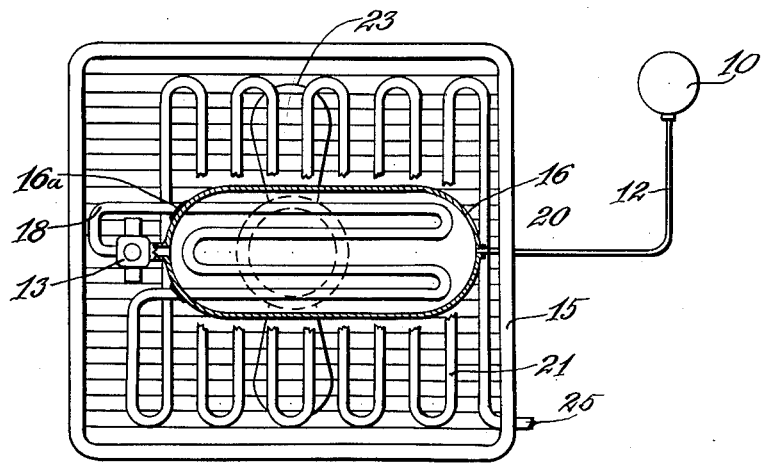
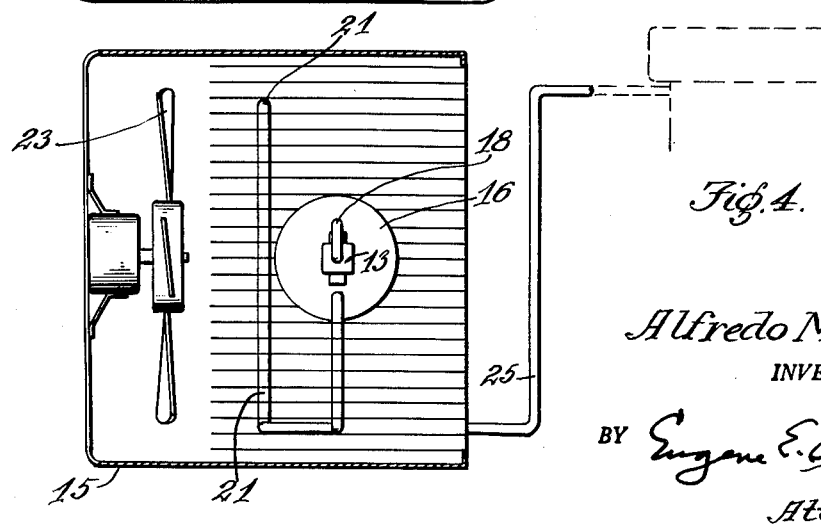
Alfredo Mendez
INVENTOR.
BY Eugene E. Ostrens
Attorney.

United States Patent Office 3,035,423
Patented May 22, 1962

3,035,423
BOOSTER FOR REFRIGERATING SYSTEMS
Alfredo Mendez, 917 W. 103rd St., Chicago, Ill.
Filed July 15, 1960, Ser. No. 43,220
4 Claims. (Cl. 62—513)

My invention relates to refrigerating systems, and more particularly to the type installed in motor cars for cooling the space therein. Usually, the refrigerating equipment is installed beneath the dash, with a framed chilling coil unit attached below the instrument panel, and a blower behind such unit to project the chilled air from the coil into the passenger compartment of the motor car.

A variant of the conventional refrigerating apparatus consists in the pre-cooling of the liquid refrigerant supplied to the system. Thus, the cooling of such refrigerant by means of a coil containing the gaseous refrigerant is the principle employed in some systems patented in recent years. However, the main object of the present invention is to make an important advance over the prior art by interposing a booster tank between the liquid refrigerant supply and the expansion valve of the refrigerating system, and leading the refrigerant through a coil in the booster tank before it passes to the evaporator coils.

A further object is to locate the booster tank and the evaporator coils in intimate relation, in order that no loss in cooling efficiency may develop between the refrigerating conduit and the coils of the evaporator.

A still further object is to avoid connecting the liquid refrigerant supply—which is warm in the environment of the motor car cowl—to the expansion valve, but convert such refrigerant to the cold gaseous state, by means of the booster tank, before the refrigerant enters the expansion valve.

Another object is to provide a booster in which a tank is combined with a refrigerating conduit built into the same, resulting in a compact accessory.

A still further object is to construct the booster within and as a part of the evaporator unit, so that the system incorporating the booster occupies no more room than one designed without the same.

An important object is to provide an improvement which adds little to the cost of the refrigerating system, yet procures a marked increase of cooling efficiency in the same.

A better understanding of the invention may be had by reference to the accompanying drawing, in which—

FIG. 1 is an elevation of a fragment of a motor car dash, showing the frontal unit of the improved refrigerating system installed;

FIG. 2 is a side view of a fragment of a trailer truck, showing the position of the unit in the same;

FIG. 3 is an enlargement of the unit of FIG. 1, partly broken away to reveal the booster tank, and showing the source of its supply; and FIG. 4 is a cross-section of the unit, showing its adaptation as a fuel source for the motor car engine.

Referring specifically to the drawing, 10 denotes the tank which serves as the source of the liquid refrigerant for the system under consideration, such liquid being known as Freon, propane, or the like.

While the supply conduit 12 from the tank 10 usually leads directly to the expansion valve 13 and then to the evaporator unit 15, it is noted that in the present case the conduit leads into one end of an accessory or booster tank 16, where the refrigerant undergoes its initial expansion into the gaseous state. The refrigerant leaves from the opposite end of the booster tank 16 to pass through the expansion valve 13 and proceed in a conduit 18 which returns into the booster tank to take an undulating course therein in the form of an internal coil 20. The latter emerges to take the form of the evaporator coil 21 in the frontal unit 15. The joints of the internal coil with the tank 16 are of course sealed by welding — as indicated at 16a—in order to insure against leakage of gas from the booster tank.

While the booster tank 16 may be installed at any point in the vicinity of the evaporator coil in order to make its connection with the same short, FIGS. 3 and 4 show that the booster tank is actually built into the evaporator unit by being located adjacent to the coils thereof. This construction eliminates exposed connections, and confines the booster fully in the environment of the evaporator unit.

With the conventional blower fan 23 located behind the booster-equipped evaporator unit 15, it is apparent that the fan will project the air chilled by the same into the passenger space of the motor car. However, such air will have a considerable lower temperature than in the case of the ordinary refrigerating system because the refrigerator coils not only chill the surrounding air as usual, but are themselves pre-chilled before they proceed to the evaporator zone. As previously mentioned, the liquid refrigerant in the supply tank 10 is relatively warm from its location near the engine compartment of the motor car. However, by means of the present invention the refrigerant goes through three chilling stages before it enters the evaporator coils, namely, (1) by its initial expansion in the booster tank 16; (2) by its further expansion in the internal coils 20; and (3) by receiving the added chilling effect of the large volume of gaseous refrigerant contained in the booster tank. In other words, the wide initial expansion of the refrigerant in the spacious booster tank makes such refrigerant colder than the gaseous refrigerant in the undulating conduit contained in the tank, so that the temperature of the circulating refrigerant is lowered by the time the coil enters the evaporator zone. Further, the location of the colder booster tank within the evaporator unit imparts a lower temperature to the same, so that air projected by the blower fan through such unit will be chilled to a low temperature. Finally, this factor is incorporated in the refrigerating system without increasing its size.

It is understood that the outlet 25 of the evaporator coil is led to a compressor (not shown) for replenishing the liquid refrigerant. However, where the same is propane fluid, a part thereof may be piped to the motor car engine as fuel, as indicated by dotted lines in FIG. 4. Also, it is possible to install the improved refrigerating system in a trailer truck, as indicated in the top portion of FIG. 2.

While I have described the invention along specific lines, various minor changes and refinements may be made therein without departing from its principle, and I reserve the right to employ all such changes and refinements as may come within the scope and spirit of the appended claims.

I claim:
1. In a refrigerating system, the combination with a fluid refrigerant source, an expansion valve, and an evaporator coil; of a tank having an inlet for receiving fluid from said source, the tank being of a capacity to allow said fluid wide expansion as a gaseous refrigerant, a direct outlet from the tank into the expansion valve, and a conduit from the latter passing through the tank to communicate with the evaporator coil.

2. The structure of claim 1, said conduit passing through the tank in undulating form.

3. The structure of claim 1, the tank being located in the environment of the evaporator coil.

4. The structure of claim 1, the tank being located adjacent to the convolutions of the evaporator coil.

References Cited in the file of this patent

UNITED STATES PATENTS

| | | |
|---|---|---|
| 2,272,093 | McCormack | Feb. 3, 1942 |
| 2,794,322 | Etherington | June 4, 1957 |
| 2,841,965 | Etherington | July 8, 1958 |